United States Patent [19]
Elks

[11] 3,715,376
[45] Feb. 6, 1973

[54] NOVEL PROCESS FOR THE PREPARATION OF 17a-HYDROXY-PREGNA-1,4,9(11)-TRIENE-3,20-DIONE

[75] Inventor: Joseph Elks, London N.W. 11, England

[73] Assignee: Glaxo Laboratories, Greenford, England

[22] Filed: May 25, 1970

[21] Appl. No.: 40,422

[52] U.S. Cl..........................260/397.45, 260/397.45
[51] Int. Cl...........................................C07c 169/32

[56] References Cited

UNITED STATES PATENTS 3,005,834  10/1961  Drake et al.........................260/397.3

OTHER PUBLICATIONS

"Steroid Reactions" by Djerassi (1963) Pages 115, 217 and 231 relied on.

*Primary Examiner*—Elbert L. Roberts
*Attorney*—Bacon & Thomas

[57] ABSTRACT

This invention relates to a novel intermediate in the synthesis of steroids having hormonal activity and to processes for its preparation and further conversion.

3 Claims, No Drawings

NOVEL PROCESS FOR THE PREPARATION OF 17A-HYDROXY-PREGNA-1,4,9(11)-TRIENE-3,20-DIONE

In our Belgian Patent No. 702023 we have described, inter alia, the compound 17α-acetoxy-6,11β-dichloro-19-norpregna-4,6-diene-3,20-dione as having outstanding progestational activity. We have also described a process for obtaining this compound from 17β-hydroxy-pregna-1,4,9-triene-3,20-dione. The latter compound is described as being obtainable by reduction of 21-iodoprednisolone which is a known and available starting material.

However, 21iodoprednisolone is relatively expensive and for large scale commercial production it is preferred to use starting materials which are cheaper. We have now found that 17α-hydroxy-pregna-1,4,9-triene-3,20-dione can readily be obtained by ring-A dehydrogenation of the novel compound 17α-hydroxy-5α-pregn-9-ene-3,20-dione which compound can itself readily be obtained from a known intermediate in the synthesis of the widely used corticosteroid betamethasone. By utilizing materials derived from a well-established and commercially economical synthetic route, the cost of the desired product can be greatly reduced as compared with the route from 21-iodoprednisolone.

The ring-A dehydrogenation of 17α-hydroxy-5α-pregn-9-ene-3,20-dione can be effected, for example, by reaction with a quinone dehydrogenating agent such as 2-3-dichloro-5,6-dicyano-benzoquinone. The reaction is preferably effected under acid conditions for example in the presence of a relatively strong organic acid such as trichloroacetic acid or p-nitrophenol. The reaction may advantageously be effected in an inert organic solvent, e.g., a cyclic ether solvent such as tetrahydrofuran or dioxan, a hydrocarbon solvent such as benzene or toluene, an ester solvent such as ethyl or isopropyl acetate or an alcohol such as t-butanol. It is preferred to use 2.5 to 3.5 moles, advantageously about 3.0 moles 2,3-dichloro-5,6-dicyanobenzoquinone per mole of steroid. The reaction temperature is advantageously in the range 90°–100°C for optimal yields.

The above ring-A-dehydrogenation can also be effected by dibromination to produce the corresponding 2,4-dibromocompound, followed by dehydrobromination to yield the desired 1,4,9-triene. The dibromination may be effected with molecular bromine in a suitable organic solvent, preferably in the presence of hydrogen bromide. The solvent may, for example, by a cyclic ether solvent such as tetrahydrofuran or dioxan, a halogenated hydrocarbon solvent such as chloroform, a carboxylic acid such as acetic acid or an ester such as ethyl acetate. A preferred solvent medium is ethyl acetate containing a small quantity of water; acetic acid is also advantageously present. The reaction is advantageously effected at between −15° and +45°C, conveniently at room temperature.

The 2- and 4-bromine atoms may be introduced in the α- and/or β-configuration but dehydrobromination may be carried out on the mixed isomers. The dehydrobromination is preferably carried out by heating the dibromo-steroid in the presence of an inert Lewis base containing a tertiary nitrogen atom and having a high dielectric constant, e.g., above 15, preferably in the range 30–40.

Bases which are preferred for the purpose of the process are those containing one of the following groups:

a. $>N-C=O$
b. $>N-C\equiv N$

Bases of high dielectric constant and suitable for the dehydrobromination process may be chosen from the group of substituted amides of the general formula $R^1.CO.NR^2R^3$ where $R^1$ is a hydrogen atom or an alkyl group containing 1 to 5 carbon atoms and $R^2$ and $R^3$, which may be the same or different, are each an alkyl group containing one to five carbon atoms, or, alternatively $R^2$ and $R^3$ together form a divalent aliphatic group which, together with the adjacent nitrogen atom, forms a heterocyclic ring. Examples of amides of this type are N,N-dimethylformamide, N,N-diethylformamide, N,N-dipropylformamide, N,N-dibutylformamide, N,N-dimethylacetamide, N,N-diethylacetamide, N,N-dimethylvaleramide, N,N-dimethylpropionamide, N-formylpiperidine and N-formylmorpholine. Of this group of compounds, we prefer to use N,N-dimethylacetamide.

Another convenient group of bases are substituted diamides of the general formula $R^2R^3NCO.(CH_2)_n-CO.NR^2R^3$, where $R^2$ and $R^3$ have the significance defined above and n is an integer from 1 – 5. Such compounds include for example N,N,N',N'-tetramethylsuccinamide and N,N,N',N'-tetramethyladipamide.

Another convenient group of tertiary bases are the N,N-dialkylcyanamides, e.g., N,N-dimethylcyanamide.

Yet another group of bases are tetraalkylureas of the general formula $R^2R^3NCO.NR^2R^3$ where $R^2$ and $R^3$ have the meanings defined above. Examples of such substituted ureas include N,N,N',N'-tetramethylurea and N,N,N',N'-tetraethylurea.

The dehydrobromination process is preferably carried out in the presence of an inorganic basic substance which is inert to the steroid reactant and the desired steroid end-product. The function of the inorganic basic substance is apparently to act as a binding agent for the hydrogen bromide, produced during the reaction. Various inorganic basic substances may be used for this purpose with the obvious limitation that they must, of course, be inert to the steroid starting material and end-products under the conditions of the reaction.

Inorganic basic substances which are suitable include carbonates, e.g., lithium carbonate, calcium carbonate, strontium carbonate and barium carbonate. Calcium carbonate is preferred and is advantageously used in finely powdered form, conveniently having a particle size less than 10 microns.

In addition to the calcium carbonate, there may also be present in the reaction mixture an added alkali metal or alkaline earth metal bromide soluble in the reaction mixture, for example, lithium bromide, sodium bromide or calcium bromide. The presence of such a bromide frequently enables the reaction to be carried out at lower temperatures and may result in an increased yield. Moreover the bromide enables one to decrease the time of reaction at lower temperatures.

The time of reaction required to effect dehydrobromination of the dibromo-steroid will depend on the temperature employed and a suitable balance of these factors may be readily determined by experiment. This may be conveniently done by heating the steroid in the chosen organic base with or without added inorganic basic substance or bromide. The reaction mixture should then be maintained at a fixed temperature, and aliquots removed at intervals. The progress of the reaction can be measured by observing a suitable physical characteristic e.g., U.V. absorption. A graph plotted on such a basic will indicate clearly the minimum time required. Analysis of the product for bromine content is also helpful.

The dehydrobromination can conveniently be effected by heating at temperatures varying from 80° to 180°C in the presence of the base and preferably the inorganic basic substance. When operating at temperatures in the lower region of the scale e.g., from 80° to 135°C it is particularly desirable to have an alkali metal or alkaline earth metal halide present in order to reduce the time required for the reaction and to give increased yield of the $\Delta^{1,4}$-3-ketone; such conditions represent the preferred method of operation.

17α-Hydroxy-5α-pregn-9-ene-3,20-dione can be obtained in high yield by oxidation of 3β,17α-dihydroxy-5α-pregn-9-en-20-one using a reagent serving to oxidize a secondary alcohol to a ketone. Chromic acid oxidizing agents are preferred, particularly Jones' reagent, i.e., chromic acid in a ketone such as acetone or methyl butyl ketone. We have found that the effectiveness of the oxidizing agent may be impaired by lack of solubility of the steroid starting material in the ketone but that this problem can readily be overcome by inclusion of a solvent for the starting compound, for example a hydrocarbon or halogenated hydrocarbon solvent e.g., methylene chloride or a substituted amide or imide solvent such as dimethylformamide or dimethylacetamide. The reaction temperature should be sufficiently high to maintain the starting steroid in solution. It is preferred to use at least two equivalents of chromic acid to avoid under-oxidation. Other reagents which may be used for the oxidation include dimethylsulphoxide oxidizing systems, for example dimethylsulphoxide together with dicyclohexyl carbodiimide or together with acetic anhydride or together with pyridine and sulphur trioxide.

The 3β,17α-dihydroxy-5α-pregn-9-en-20-one used in the above oxidation can be obtained by reduction of 3β-hydroxy-17α-hydroperoxy-5α-pregn-9-en-20-one for example by catalytic hydrogenation, e.g., using palladium as catalyst, or using a chemical reducing agent such as zinc in an aliphatic carboxylic acid, e.g., acetic acid; potassium iodide in acetic acid; or sodium sulphite. The most preferred reducing agents, however, are trisubstituted phosphorus compounds, including tri-hydrocarbylphosphines such as triphenylphosphine, salts of alkylsulphinic acids e.g., alkali metal salts of lower alkyl sulphinic acids and, more especially, trialkyl phosphites, particularly trilower alkyl phosphites such as trimethyl or triethyl phosphite. Such lower alkyl compounds preferably contain 1-8 carbon atoms in each alkyl group.

The above 3β-hydroxy-17α-hydroperoxy-5α-pregn-9-en-20-one may be obtained by reaction of an enolate of 3β-hydroxy-5α-pregn-9-en-20-one with molecular oxygen. Thus, 3β-hydroxy 5α-pregn-9-en-20-one can be converted into its enolate, for example by reaction with a basic enolizing agent, such as an alkali metal hydride, an alkali metal amide, an alkali metal triphenylmethyl or a quaternary ammonium hydroxide. Preferred enolizing agents are alkali metal alkoxides of aliphatic alcohols such as the sodium and potassium alkoxides of butanol. These alkoxides may be formed in situ by reaction of an alkali metal hydride with the appropriate alcohol. The molecular oxygen may be introduced into the reaction medium by bubbling in the gas. A solvent will advantageously be present, for example a polar organic solvent, such as an ether solvent e.g., tetrahydrofuran or dimethoxyethan, or a substituted amide, imide or hydantoin solvent such as dimethylformamide.

The subsequent reduction of the 17α-hydroperoxy group may advantageously be effected by incorporating in the oxygenated solution of the enol one of the trisubstituted phosphorus compounds, salts of alkylsulphinic acids or trialkyl phosphites referred to above. The reducing agent is advantageously added to the solution of the enolizing base, and, after oxygenation of the solution, the steroid is added slowly. The reaction temperature is preferably low for example below about 10°C, e.g., in the range −50° to −10°C, for example about −35°C.

It is also possible to use as starting material in the above reaction 3β-acetoxy-5α-pregn-9-en-20-one. The 3β-acetoxy material may in part be hydrolyzed during the oxygenation process; any acetate remaining can subsequently be hydrolyzed to yield the desired 3β-hydroxy compound, for example using aqueous alkali metal hydroxide. This method possesses the advantage that the 3β-acetate is readily available.

3β-Hydroxy-5α-pregn-9-en-20-one and its acetate which may be used as starting material in the above oxidation, are known compounds described by Djerassi (J. Org. Chem. 1951, 61, 1278–1282). The 3-acetate may be obtained by hydrogenation, for example using palladium on charcoal as catalyst, of 3β-acetoxy-5α-pregn-9,16-dien-20-one, which, as indicated previously, is a compound used as an intermediate in a commercial synthesis of betamethasone from the naturally occurring sapogenin, hecogenin. The use of 17α-hydroxy-5α-pregn-9-ene-3,20-dione and its precursors as intermediates in the synthesis of the highly active compound 17α-acetoxy-6,11β-dichloro-19-norpregna-4,6-diene-3,20-dione, by providing a link with a synthesis already in large scale production, enables the latter to be produced more cheaply than was possible by the previously described route starting from 21-iodoprednisolone.

The following Examples are given by way of illustration only.

EXAMPLE 1

Dry sec-butanol (100 mls) and dry dimethyl formamide (600 mls) were added to a suitable stirred reaction vessel. Under an atmosphere of nitrogen there was added sodium hydride in oil (equivalent to 23.5 gm dry sodium hydride) at such a rate that the temperature rose to 35°–40°C and was maintained at this temperature only by the addition of cold dry dimethyl formamide (400 mls). After the addition of the sodium hydride, stirring was continued at 35°–40°C for 30 minutes. The reaction mixture was cooled to −35°C., and trimethyl phosphite (80 mls) at 25°C was added. Oxygen was bubbled through the cold solution for 5 minutes and then there was added, with continuing oxygenation, a solution of 3β-acetoxy-5α-pregn-9-en-20-one (200 g) in dry tetrahydrofuran (500 mls) over a period of 1½ hours with the temperature kept in the range −35°C ± 3°C. Stirring was continued for 30 minutes at −35°C. The oxygen was replaced by nitrogen and a solution of sodium hydroxide (20 g) in water (200 mls) and methanol (400 mls) was added. The reaction mixture was warmed to 30°C and stirred for 1 hour. Acetic acid (70 mls) was added and the product was precipitated by the slow addition of water (2,150 mls) at 65°C. After cooling to room temperature and ageing for 1 hour, the product was collected by filtration, water washed and dried in an air oven at 60°C. Yield 197.5 gms. This crude product was stirred at reflux in methanol (3 l) and ethyl acetate (10.5 l) with Floridin earth (200 gm) for 1 hour. The Floridin earth was filtered from the hot solution and the solvent removed to a residual volume of 2 liters. Ethyl acetate (2 liters) was added and the volume again reduced by distillation to 2 liters. The slurry was cooled to 0°C and aged at this temperature for 2 hours. The product was collected by filtration, washed with cold ethyl acetate (400 mls), and dried in an air oven at 60°C. Yield 154 gms, 77 percent w/w, 83 percent of Theory of 3β,17α-dihydroxy-5α-pregn-9-en-20 one, $[\alpha]_D$ −24.6 (c, 0.5 in chloroform), M.Pt. 250°−2°C.

EXAMPLE 2

3β,17α-Dihydroxy-5α-pregn-9-en-20-one (300 g) was dissolved with stirring at 45°C in a mixture of dimethylformamide (4.6 l) and acetone (6.9 l). 571 ml. of a 1.06M solution of sodium dichromate in ca 10N sulphuric acid was added to the stirred solution over 35 minutes at 45° ±2°C and the mixture was stirred for a further 25 minutes at 45°C. Methanol (500 ml) was then added, and the bulk of the solvent (ca 6.5 l) was removed by distillation under reduced pressure. Water (13 l.) was added and the mixture was stirred for 10 minutes. The product was collected by filtration, washed thoroughly with water, and dried in an air oven at 70°C overnight.

Yield 286.4 g. 95.5 percent w/w, 96.1 percent of Theory of 17α-hydroxy-5α-pregn-9-en-3,20 dione, M.Pt. 249°−251°C $[\alpha]_D$ +44° (c, 0.5 in dioxan).

EXAMPLE 3

17α-Hydroxy-5α-pregn-9-ene-3,20-dione

3β,17α-Dihydroxy-5α-pregn-9-en-20-one (33.63 g.) in a mixture of acetone (3.92 l) and methylene chloride (1.0 l) was stirred in a 10 l. bolthead flask at 45°C and a solution of sodium dichromate (13.6 g.) in water (29.6 ml.) containing concentrated sulphuric acid (10.3 ml.) was added over 5 minutes. Stirring was continued at the same temperature for 20 minutes. Water (590 ml.) was added and the solution concentrated (to ≈ 3 l) by distillation. More water (6 l.) was added to the concentrate and the resulting solid was filtered off, washed copiously with water and dried in vacuo at 40°C to give crude 17α-hydroxy-5α-pregn-9-ene-3,20-dione (31.4 g.) in 94 percent of theory.

The crude product was recrystallized from methanol (300 ml.) to give purer material (24.9 g.) in 83 percent recovery. M.p. 252°−4°C; $[\alpha]_D$ +54.3 (c, 0.54 dioxan).

Example 4

2,4-Dibromo-17α-hydroxy-5α-pregn-9-ene-3,20-dione

17α-Hydroxy-5α-pregn-9-ene-3,20-dione (3.3 G.) was suspended in a 1:1 mixture of ethyl acetate and acetic acid (0.33 ml.) at room temperature. Stirring was continued for 5 minutes before a solution of bromine (1.28 ml.) in acetic acid (12 ml.) was added over 6 minutes. The reaction was completed by stirring for a further 9 minutes at the same temperature during which time the solid had dissolved. The solution was poured into chloroform (30 ml.)/water (120 ml.) and the layers were separated. The aqueous layer was extracted with chloroform (2 × 20 ml.) and the extracts combined with the organic phase. The resulting solution was washed with water (2 × 50 ml.), saturated aqueous sodium bicarbonate solution (1 × 50 ml.) and water (2 × 50 ml.) and dried over magnesium sulphate. The solvent was removed by distillation under reduced pressure and the residual froth was triturated with diethyl ether (100 ml.). The crystalline solid was filtered off, washed with ether to give crude 2,4-dibromo-17α-hydroxy-5α-pregn-9-ene-3,20-dione (2.2 g.) in 45 percent yield. M.p. 169°C (d); $[\alpha]_D$ 0° (c, 1.0 in $CHCl_3$).

Concentration of the mother liquors followed by the addition of petroleum ether (80°−100°C) afforded in second crop (1.1 g.) M.p. 162°C(d).

EXAMPLE 5

17α-Hydroxypregna-1,4,9(11)-triene-3,20-dione 2,4-Dibromo-17α-hydroxy-5α-pregn-9-ene-3,20-dione (crude; 1.0 g.) in dimethylacetamide (10 ml.) was heated at 135°−40°C for 2 hours with calcium carbonate (Calofort U;2 g) and anhydrous lithium bromide (1.0 g.) under a blanket of nitrogen and with good stirring. The mixture was cooled (≈60°C) and poured into acidified (acetic acid) water (50 ml.). The solid was filtered off, washed well with water and dried at 40°C in vacuo. Recrystallization from acetone/cyclohexane gave the crude triene (0.35 g.) in 52.4 percent of theory. M.p. 190°−2°C; $[\alpha]_D$ + 20° (c, 1.0 in dioxan).

EXAMPLE 6

17α-Hydroxy-5α-pregn-9-en-3,20 dione (150 g.), dioxan (7.5 l). 2,3-dichloro-5,6-dicyanobenzoquinone (310 g) and trichloroacetic acid (37.5 g) were charged to a suitable reaction flask and the mixture heated with stirring under nitrogen at 90°−95°C for 17 hours. The solution was cooled to 20°C and the 2,3-dichloro-5,6-dicyanohydroquinone which crystallized was collected by filtration and washed with dioxan (500 ml.) The combined filtrates were concentrated by distillation under reduced pressure to ca 2 l, and the concentrate transferred to a separating funnel. Methylene chloride (3 l.) was added, and the solution was washed with 10 percent sodium carbonate solution (4 l, 2 × 2 l) and with 2 percent sodium chloride solution (2 × 2 l), the washes being back extracted successively with methylene chloride (1 l.). The combined methylene chloride extracts were dried over sodium sulphate (150 g.), the mixture filtered, and the filtrate distilled to dryness under reduced pressure. To remove residual dioxan, methanol (500 ml.) was added, the mixture refluxed for 5 minutes, and the solvent removed under reduced pressure.

Methanol (1.5 l) was added and the mixture refluxed with stirring until solution was complete. The solution was concentrated by distillation at atmospheric pressure, 1.15 l. of methanol being removed. The solution was kept at 0°C overnight, the product collected by filtration, washed with chilled methanol (2 × 50 ml.), and dried in an air oven at 60°C.

Yield 73.5 g, 49.0 percent w/w, 49.6 percent of theory of 17α-hydroxy-5α-pregna-1,4,9-triene-3.20 dione, M.Pt. 227°–9°C, $[\alpha]_D + 8.7°$ (c, 1.0 in dioxan).

EXAMPLE 7

Dry t-butanol (220 ml.) and dry dimethylformamide (1,100 ml.) were added to a suitably stirred reaction vessel. Under an atmosphere of nitrogen there was added sodium hydride in oil (equivalent to 23.5 g. of dry sodium hydride) at such a rate that the temperature rose to 30°–35°C and was maintained in this range by external cooling. After the addition of sodium hydride stirring was continued at 30°–35°C for 30 minutes. The reaction mixture was cooled to −35°C and triethyl phosphite (100 ml.) was added. Oxygen was bubbled through the cold solution for 5 minutes and then there was added, with continuing oxygenation, a solution of 3β-acetoxy-5α-pregn-9-en-20-one (200 g.) in dry tetrahydrofuran (500 ml.) over a period of 1½ hours, with the temperature kept in the range −32°C to −38°C. Stirring was continued for 30 minutes at −35°C. The oxygen was replaced by nitrogen and a solution of sodium hydroxide (20 g.) in water (200 ml.) and methanol (400 ml.) was added. The reaction mixture was warmed to +30°C and stirred for 1 hour. Acetic acid (70 ml.) was added and the solvents removed by distillation under reduced pressure. The residue was dissolved at reflux in methanol (9,000 ml.) and a solution of potassium carbonate (100 g.) in water (1,000 ml.) added. Methanol (3,000 ml.) was removed by distillation as water (3,000 ml.) was added. After cooling to room temperature and ageing for 1 hour, the product was collected by filtration, washed with 40 percent aqueous methanol (1,500 ml.) and dried in an air oven at 60°C. Yield 180 g. This crude product was stirred at reflux in methanol (3,000 ml.) and ethyl acetate (10,500 ml.) with Floridin earth (200 g.) for 1 hour. The Floridin earth was filtered off from the hot solution and the filtrate was concentrated to a residual volume of 2 liters. Ethyl acetate (2,000 ml.) was added and the volume again reduced by concentration to 2 liters. The slurry was cooled to 0°C and aged at this temperature for 2 hours. The product was collected by filtration, washed with cold ethyl acetate (400 ml.) and dried in an air oven at 60°C. Yield 140 g., 70 percent w/w, 75.5 percent th. of 3β, 17α-dihydroxy-5α-pregn-9 -en-20-one, m.p. 251°–3°,$[\alpha]_D^{20} -25.1°$ (c,0.5 in CHCl$_3$).

EXAMPLE 8

When t-butyl alcohol in Example 7 was replaced by iso-butyl alcohol, the yield of 3β, 17α-dihydroxy-5α-pregn-9-en-20-one, m.p. 254°–6°, $[\alpha]_D^{20} -26.5°$, was 67.5 percent w/w, 72.6 percent of theory.

EXAMPLE 9

3β,17α-Dihydroxy-5α-pregn-9-en-20-one (1.0 g.) was dissolved with heating and stirring in a mixture of acetic acid (40 ml.) and methylene chloride (10 ml.), and the solution cooled to ca 20°. A solution of sodium dichromate in 11N-sulphuric acid (1.7 ml., 1.0 M) was added dropwise, and the sodium stirred in 30 minutes. The methylene chloride was removed by distillation, water added and the crude 17α-hydroxy-5α-pregn-9-ene-3,20-dione (0.6 g.) collected by filtration.

EXAMPLE 10

3β,17α-Dihydroxy-5α-pregn-9-en-20-one (1.0 g.) was dissolved with stirring at room temperature in dimethyl-formamide (20 ml.) and acetone (30 ml.) added. A solution of sodium dichromate in 11N-sulphuric acid (1.7 ml., 1.0 M) was added dropwise, and the solution stirred for 30 minutes. A little of the acetone was removed by distillation under reduced pressure. Slow addition of water, followed by filtration and drying gave 17α-hydroxy-5α-pregn-9-ene-3,20-dione (0.9 g.) which on T.L.C. evidence contained 1–2 percent of starting material.

EXAMPLE 11

3β,17α-Dihydroxy-5α-pregn-9-en-20-one (2.0 g.) was dissolved with stirring at 70° in a mixture of dimethylformamide (17.5 ml.) and methyl ethyl ketone (17.5 ml.). A solution of sodium dichromate in 11N-sulphuric acid (3.9 ml., 1.05 M) was added dropwise over 5 minutes, and stirring continued at 70° for 2 hours. After work-up as in Example 10 there was obtained 17α-hydroxy-5α-pregn-9-ene-3,20-dione (1.85 g.), which on T.L.C. evidence contained 2–3 percent of starting material.

EXAMPLE 12

3β,17α-Dihydroxy-5α-pregn-9-en-20-one (2.0 g.) was dissolved with stirring at 45° in dimethylformamide (30 ml.). A solution of sodium dichromate in 11N-sulphuric acid (3.9 ml., 1.05 M) was added dropwise, and stirring continued at 45° for 40 minutes. After work-up as in Example 10 there was obtained crude 17α-hydroxy-5α-pregn-9-ene-3,20-dione (1.95 g.), which on T.L.C. evidence contained ca 30 percent starting material, and a distinct non-polar unknown impurity.

EXAMPLE 13

A mixture of 17α-hydroxy-5α-pregn-9-ene-3,20-dione (1.0 g.), toluene (50 ml.), 2,3-dichloro-5,6-dicyano-benzoquinone (DDQ) (2.06 g.) and trichloroacetic acid (0.75 g.) was refluxed with stirring for 8 hours. The solution was cooled and the precipitated hydroquinone removed by filtration. The filtrate was diluted with benzene and washed with 10 percent sodium carbonate solution (200 ml., 2 × 100 ml.) and water (2 × 100 ml.). After drying over sodium sulphate the solution was taken to dryness to give a crude product (0.70 g.) which on T.L.C. evidence was mainly 17α-hydroxypregna-1,4,9-triene-3,20-dione, with 3–5 percent of the $\Delta^{1,9}$ analogue and an appreciable amount of unknown impurities

EXAMPLE 14

A mixture of 17α-hydroxy-5α-pregn-9-ene-3,20-dione (1.0 g.) dioxan (50 ml.) and DDQ (2.06 g.) was heated at 95° for 30 hours. The solution was cooled to room temperature and the precipitated hydroquinone removed by filtration. The filtrate was concentrated to about one-third volume, methylene chloride (15- ml.) added, and the solution washed with 10 percent sodium carbonate solution (200 ml., 2 × 100 ml.) and water (2 × 100 ml.). After drying over sodium sulphate, the solution was taken to dryness to give a crude product (0.8 g.) which on T.L.C. evidence contained 70 percent of 17α-hydroxypregna-1,4,9-triene-3,20-dione, and a small amount of the $\Delta^{1,9}$ analogue.

EXAMPLE 15

A mixture of 17α-hydroxy-5α-pregn-9-ene-3,20-dione (1.0 g.), dioxan (50 ml.), DDQ (2.06 g.) and p-nitrophenol (0.5 g.) was heated at 95° overnight. The solution was cooled and the precipitated hydroquinone removed by filtration. The filtrate was concentrated, methylene chloride (150 ml.) added, and the solution washed with 10 percent sodium carbonate solution (200 ml., 2 × 100 ml.) and water (2 × 100 ml.). After drying over sodium sulphate, the solution was taken to dryness to give a crude product (0.8 g.), which on T.L.C. evidence was mainly 17α-hydroxypregna-1,4,9-triene-3,20-dione, with ca 5 percent of its $\Delta^{1,9}$ analogue and 2–3 percent less polar impurities.

EXAMPLE 16

A mixture of 17α-hydroxy-5α-pregn-9-ene-3,20-dione (1.0 g.), dioxan (20 ml.), DDQ (1.7 g.) and acetic acid (0.1 ml.) was heated at 95° overnight. After work-up as in Example 15 0.75 g. of crude product was isolated. T.L.C. showed this to be mainly 17α-hydroxypregna-1,4,9-triene-3,20-dione, with 10 percent of the $\Delta^{1,9}$ analogue.

What we claim is:

1. A process for preparing 17α-hydroxy-pregna-1,4,9 (11)-triene-3,20-dione which comprises the consecutive steps of:
   a. reacting the enolate of 3β-hydroxy-5α-pregn-9(11)-en-20-one or 3β-acetoxy-3α-pregn-9-en-20-one with molecular oxygen to give 3β-hydroxy-17α hydroperoxy-5α-pregn-9(11)-en-20-one-or 3β-acetoxy-17αhydroperoxy-5α-pregn-9(11)-en-20-one;
   b. reducing the product of (a) to give 3β,17α-dihydroxy-5α-pregn-9(11)-en-20-one;
   c. oxidizing the product of (b) with a reagent serving to oxidize a secondary alcohol to a ketone to give 17α- hydroxy-5α-pregn-9(11)-ene-3,20-dione; and
   d. dehydrogenating the A-ring of the product of (c) to give the 17α-hydroxy-pregna-1,4,9(11)-triene-3,20-dione.

2. The process of claim 1 wherein the 3β-acetoxy-5α-pregn-9(11)-en-20-one in (a) is obtained by hydrogenation of 3β-acetoxy-5α-pregn-9(11),16-dien-20-one.

3. The process of claim 1 wherein the 3β-hydroxy-5α-pregn-9(11)-en-20-one in (a) is obtained by hydrogenating 3β-acetoxy-5α-pregn-9(11),16-dien-20-one followed by hydrolysis of the resultant product.

* * * * *